(12) United States Patent
Kang

(10) Patent No.: US 10,971,131 B2
(45) Date of Patent: Apr. 6, 2021

(54) METHOD AND APPARATUS FOR GENERATING SPEECH SYNTHESIS MODEL

(71) Applicant: Baidu Online Network Technology (Beijing) Co., Ltd., Beijing (CN)

(72) Inventor: Yongguo Kang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 133 days.

(21) Appl. No.: 16/053,897

(22) Filed: Aug. 3, 2018

(65) Prior Publication Data
US 2019/0096385 A1  Mar. 28, 2019

(30) Foreign Application Priority Data

Sep. 28, 2017  (CN) .......................... 2017 1 0898536

(51) Int. Cl.
*G10L 13/027* (2013.01)
*G10L 13/033* (2013.01)
(Continued)

(52) U.S. Cl.
CPC .......... *G10L 13/027* (2013.01); *G06K 9/6256* (2013.01); *G06N 3/08* (2013.01);
(Continued)

(58) Field of Classification Search
CPC ......... G10L 13/00; G10L 13/04; G10L 13/08; G06N 3/02
See application file for complete search history.

(56) References Cited

U.S. PATENT DOCUMENTS

| 8,527,276 B1 * | 9/2013 | Senior ................... G06N 3/084 704/259 |
| 2013/0238337 A1 * | 9/2013 | Kamai .................. G10L 21/003 704/258 |

(Continued)

FOREIGN PATENT DOCUMENTS

| CN | 105374350 A | 3/2016 |
| CN | 105390141 A | 3/2016 |

OTHER PUBLICATIONS

Fan, Yuchen, et al. "Speaker and language factorization in DNN-based TTS synthesis." 2016 IEEE International Conference on Acoustics, Speech and Signal Processing (ICASSP). IEEE, 2016. (Year: 2016).*

*Primary Examiner* — Paras D Shah
(74) *Attorney, Agent, or Firm* — Lathrop GPM LLP

(57) ABSTRACT

The present disclosure discloses a method and apparatus for generating a speech synthesis model. A specific embodiment of the method comprises: acquiring a plurality of types of training samples, each of the plurality of types of training samples including a text of the type, and a speech of the text having a style of speech corresponding to the type read by an announcer corresponding to the type; and training a neural network corresponding to a speech synthesis model using the plurality of types of training samples and an annotation of the style of speech in the each of the plurality of types of training samples to obtain the speech synthesis model, the speech synthesis model being used to synthesize speech of the announcer corresponding to each of the plurality of types having a plurality of styles.

9 Claims, 3 Drawing Sheets

(51) Int. Cl.
*G06N 3/08* (2006.01)
*G10L 13/00* (2006.01)
*G06K 9/62* (2006.01)
*G10L 25/30* (2013.01)

(52) U.S. Cl.
CPC ............ *G10L 13/00* (2013.01); *G10L 13/033* (2013.01); *G10L 25/30* (2013.01)

(56) References Cited

U.S. PATENT DOCUMENTS

| | | | |
|---|---|---|---|
| 2014/0025382 A1* | 1/2014 | Chen | G10L 13/10 704/260 |
| 2015/0186359 A1* | 7/2015 | Fructuoso | G10L 13/08 704/8 |
| 2016/0140951 A1* | 5/2016 | Agiomyrgiannakis | G10L 13/02 704/260 |
| 2017/0092258 A1* | 3/2017 | Edrenkin | G10L 13/08 |
| 2018/0122361 A1* | 5/2018 | Silveira Ocampo | G10L 13/033 |
| 2019/0050875 A1* | 2/2019 | McCord | G10L 25/63 |

\* cited by examiner

METHOD AND APPARATUS FOR GENERATING SPEECH SYNTHESIS MODEL

CROSS-REFERENCE TO RELATED APPLICATIONS

This application claims priority to Chinese Patent Application no. 201710898536.3, filed with the State Intellectual Property Office of the People's Republic of China (SIPO) on Sep. 28, 2017, the content of which is incorporated herein by reference in its entirety.

TECHNICAL FIELD

The present disclosure relates to the field of computer, specifically to the field of speech, and more specifically to a method and apparatus for generating a speech synthesis model.

BACKGROUND

A speech synthesis model is generated by training the neural network corresponding to the speech synthesis model. In order to provide synthesized speeches of a plurality of announcers having a plurality of different styles for the user, for each announcer, it is required to respectively perform the training using speeches of the announcer having a plurality of styles, to respectively generate a speech synthesis model for synthesizing the speech of each announcer having each style, resulting in heavy training costs.

SUMMARY

The present disclosure provides a method and apparatus for generating a speech synthesis model to solve a part of the technical problem mentioned in the foregoing Background.

In a first aspect, the present disclosure provides a method for generating a speech synthesis model. The method includes: acquiring a plurality of types of training samples, each of the plurality of types of training samples including a text of the type, and a speech of the text having a style of speech corresponding to the type read by an announcer corresponding to the type in the style; and training a neural network corresponding to a speech synthesis model using the plurality of types of training samples and an annotation of the style of speech in the each of the plurality of types of training samples to obtain the speech synthesis model, the speech synthesis model being used to synthesize the speech of the announcer corresponding to each of the plurality of types having a plurality of the styles.

In a second aspect, the present disclosure provides an apparatus for generating a speech synthesis model. The apparatus includes: an acquisition unit, configured to acquire a plurality of types of training samples, each of the plurality of types of training samples including a text of the type, and a speech of the text having a style of speech corresponding to the type read by an announcer corresponding to the type in the style; and a training unit, configured to train a neural network corresponding to a speech synthesis model using the plurality of types of training samples and an annotation of the style of speech in the each of the plurality of types of training samples to obtain the speech synthesis model, the speech synthesis model being used to synthesize the speech of the announcer corresponding to each of the plurality of types having a plurality of the styles.

In the method and apparatus for generating a speech synthesis model provided by the present disclosure, the plurality of types of training samples are acquired. Each of the plurality of types of training samples includes a text of the type, and a speech of the text having a style of speech corresponding to the type read by an announcer corresponding to the type in the style. A neural network corresponding to a speech synthesis model is trained using the plurality of types of training samples and an annotation of the style of speech in the each of the plurality of types of training samples to obtain the speech synthesis model, the speech synthesis model being used to synthesize the speech of the announcer corresponding to each of the plurality of types having a plurality of the styles. Accordingly, the speech synthesis model that may synthesize the speech of each announcer having a plurality of styles is obtained by training the neural network corresponding to the speech synthesis model only using speeches of a plurality of announcers, each of the announcer having a different single style, thereby reducing training costs.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
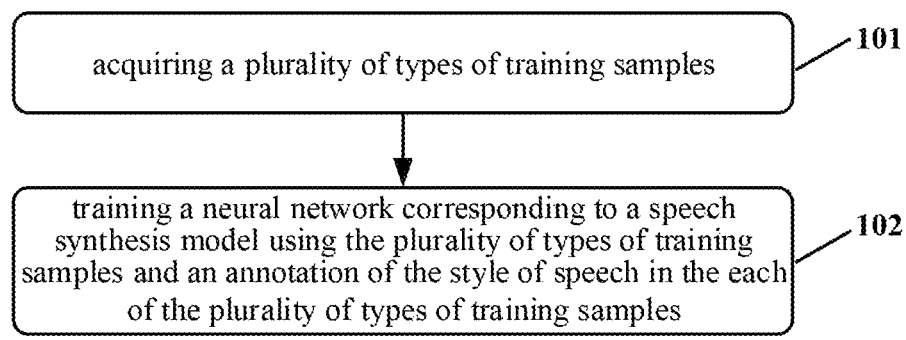
FIG. 1 is a flowchart of an embodiment of a method for generating a speech synthesis model according to the present disclosure.

Referring to FIG. 1, a flow of an embodiment of a method for generating a speech synthesis model according to the present disclosure is illustrated. The method includes the following steps.

Step 101, acquiring a plurality of types of training samples.

In this embodiment, a speech synthesis model is generated by training a neural network corresponding to the speech synthesis model using the training samples. In order to train the neural network corresponding to the speech synthesis model, the plurality of types of training samples for training the neural network corresponding to the speech synthesis model may first be acquired.

When the neural network corresponding to the speech synthesis model is trained, the neural network corresponding to the speech synthesis model is trained in an end-to-end manner by respectively providing a text characteristic at the input end of the neural network corresponding to the speech synthesis model, and providing the acoustics characteristic of the speech at the output end of the neural network corresponding to the speech synthesis model.

In this embodiment, a training sample includes a text, and a speech corresponding to the text. A type of training sample includes: a text of the type, and the speech of the text having a style of speech corresponding to the type read by an announcer corresponding to the type in the style. Types of the training samples and styles of speech in the training samples may correspond to each other.

For example, the style of speech corresponding to a news type is a news style, and the style of speech corresponding to a novel type is a novel style.

A training sample of the news type includes the text of the news type, and the speech having a news style of the text of the news type read by an announcer corresponding to the news type in the style of news type, i.e., a style of reading news. The announcer corresponding to the news type may read a text of the news type in advance. The text of the news type and the speech of the text of the news type read by the announcer corresponding to the news type in the news style are used as the training sample of the news type.

In this embodiment, the announcers and the types of training samples may also correspond to each other. For example, the training sample of the news type and the training sample of the novel type respectively correspond to an announcer. The announcer corresponding to the news type respectively reads a plurality of texts of the news type to obtain a plurality of training samples of the news type. Each sample of the news type includes the text of the news type, and the speech of the text of the news type read by the announcer corresponding to the news type in the news style. The announcer corresponding to the novel type respectively reads a plurality of texts of the novel type to obtain a plurality of training samples of the novel type. Each sample of the novel type includes the text of the novel type, and the speech of the text of the novel type read by the announcer corresponding to the novel type in the novel style.

Step 102, training a neural network corresponding to a speech synthesis model using the plurality of types of training samples and an annotation of the style of speech in the each of the plurality of types of training samples.

In this embodiment, the neural network corresponding to the speech synthesis model is trained using the plurality of types of training samples and the annotation of the style of speech in the each of the plurality of types of training samples to obtain the speech synthesis model. The annotation of the style of speech in the training sample may represent the style of the speech.

During a training process, when the neural network corresponding to the speech synthesis model is trained using a training sample, the neural network corresponding to the speech synthesis model may determine the style of speech used for the training according to the annotation of the style of speech in each training sample. Meanwhile, the neural network corresponding to the speech synthesis model may further determine the announcer who reads the speech in the training sample.

After a plurality of trainings on the neural network corresponding to the speech synthesis model using the plurality of types of training samples and the annotation of the style of the each of the plurality of types of training samples, the neural network corresponding to the speech synthesis model may simultaneously learn an acoustic characteristic of each announcer himself and a style characteristic corresponding to the each announcer.

Assuming that the neural network corresponding to the speech synthesis model is trained using the training sample of the news type corresponding to announcer A and the training sample of the novel type corresponding to announcer B. A parameter in the neural network corresponding to the speech synthesis model is shared during the training performed using the each type of training sample. Therefore, after the neural network corresponding to the speech synthesis model is trained using the training sample of the news type corresponding to announcer A and the training sample of the novel type corresponding to announcer B, the neural network corresponding to the speech synthesis model may learn a characteristic of the speech of the news style (i.e., a characteristic of reading news) and a characteristic of the speech of the novel style (i.e., a characteristic of reading a novel), and may also learn a characteristic of the speech of announcer A and a characteristic of the speech of announcer B.

The neural network corresponding to the speech synthesis model after the plurality of trainings may combine the learned characteristic of the speech of announcer A and the learned characteristic of reading the novel to synthesize the speech of announcer A reading the novel, and may combine the learned characteristic of the speech of announcer B and the learned characteristic of reading the news to synthesize the speech of announcer B reading the news.

In other words, the neural network corresponding to the speech synthesis model after the plurality of trainings may be referred to as the speech synthesis model. The speech synthesis model may combine the learned characteristic of the speech of announcer A and the learned characteristic of reading the novel to synthesize the speech of announcer A reading the novel, and may combine the learned characteristic of the speech of announcer B and the learned characteristic of reading the news to synthesize the speech of announcer B reading the news.

In some alternative implementations of this embodiment, the neural network corresponding to the speech synthesis model may include a plurality of neural networks sequentially connected from the bottom to the top. Each neural network in the neural network corresponding to the speech synthesis model corresponds to one layer of the neural network corresponding to the speech synthesis model. For example, the neural network corresponding to the speech synthesis model includes a plurality of sequentially connected DNNs from the bottom to the top. Each DNN corresponds to one layer. Above the layer on which the last DNN is located, a plurality of RNNs are included, and each RNN corresponds to one layer.

One layer in the neural network corresponding to the speech synthesis model may be selected in advance. During a training process, when the neural network is trained using one training sample, the annotation of the style of speech in the training sample and an output of a neural network in the selected layer of the neural network corresponding to the speech synthesis model may be combined to form an input of the neural network of an upper layer of the selected layer in the neural network corresponding to the speech synthesis model. That is, the annotation of the style of speech in the training sample and the output of the neural network in the selected layer of the neural network corresponding to the speech synthesis model are combined to be inputted into the neural network of the upper layer of the selected layer in the neural network corresponding to the speech synthesis model.

During the training process, when the neural network corresponding to the speech synthesis model is trained using the training sample, a style vector corresponding to the speech in the training sample and an output vector of the neural network in the selected layer of the neural network corresponding to the speech synthesis model may be combined to form an input vector of the neural network of the upper layer of the selected layer in the neural network corresponding to the speech synthesis model. The input vector is inputted into the neural network in the upper layer of the selected layer in the neural network corresponding to the speech synthesis model. The style vector corresponding to the speech in the training sample includes a respective component corresponding to each style of speech in a plurality of styles of speech. A numerical value of the component corresponding to the style of speech in the training sample is 1, and numerical values of components of other styles of speech are 0.

For example, the neural network corresponding to the speech synthesis model includes a plurality of sequentially connected DNNs from the bottom to the top. Each DNN corresponds to one layer. Above the layer on which the last DNN is located, a plurality of RNNs are included, and each RNN corresponds to one layer.

When the neural network corresponding to the speech synthesis model is trained using the training sample of the news type, a numerical value of a component corresponding to the style of speech in the training sample (i.e., the news style) in the style vector corresponding to the training sample is 1, and numerical values of components corresponding to other styles of speech are 0. The style vector corresponding to the training sample and an output vector of the last RNN in the neural network corresponding to the speech synthesis model may be combined to form an input vector of an output layer above the layer where the last RNN is located, and the input vector is inputted into the output layer.

In some alternative implementations of this embodiment, the selected layer of the neural network corresponding to the speech synthesis model is a layer connected to the output layer of the neural network corresponding to the speech synthesis model. During a training process, when the neural network corresponding to the speech synthesis model is trained using a training sample, the style vector corresponding to the speech in the training sample and the output vector of the layer connected to the output layer of the neural network corresponding to the speech synthesis model are combined to form the input vector of the output layer, and then the input vector is inputted into the output layer of the neural network corresponding to the speech synthesis model.

In some alternative implementations of this embodiment, after the speech synthesis model is obtained, an inputted speech synthesis instruction and a second text may be received. The speech synthesis instruction includes a first identifier of the announcer selected by a user, and a second identifier of the style of speech selected by the user. The speech of the second text of the announcer selected by the user having the style of speech selected by the user is synthesized using the speech synthesis model Assuming that the neural network corresponding to the speech synthesis model is trained using the training sample of the news type corresponding to announcer A and the training sample of the novel type corresponding to announcer B. The parameter in the neural network corresponding to the speech synthesis model is shared during the training performed using the each type of training sample. Therefore, after the neural network corresponding to the speech synthesis model is trained using the training sample of the news type corresponding to announcer A and the training sample of the novel type corresponding to announcer B, the neural network corresponding to the speech synthesis model may learn the characteristic of reading the news and the characteristic of reading the novel, and may also learn the characteristic of the speech of announcer A and the characteristic of the speech of announcer B.

The neural network corresponding to the speech synthesis model after the plurality of trainings may combine the learned characteristic of the speech of announcer A and the learned characteristic of reading the novel to synthesize the speech of announcer A reading the novel, and may combine the learned characteristic of the speech of announcer B and the learned characteristic of reading the news to synthesize the speech of announcer B reading the news.

In other words, the neural network corresponding to the speech synthesis model after the plurality of trainings may be referred to as the speech synthesis model. The speech synthesis model may combine the learned characteristic of the speech of announcer A and the learned characteristic of reading the novel to synthesize the speech of announcer A reading the novel, and may combine the learned characteristic of the speech of announcer B and the learned characteristic of reading the news to synthesize the speech of announcer B reading the news.

When the user of the speech synthesis model needs to synthesize the speech of announcer A reading the novel using the speech synthesis model, the inputted speech synthesis instruction and the second text may be received. The speech synthesis instruction includes the first identifier of the announcer selected by the user (i.e., the identifier of announcer A), and the second identifier of the style of speech selected by the user (i.e., the identifier of the novel style). The speech of announcer A reading the novel may be synthesized using the speech synthesis model.

Figure 2:
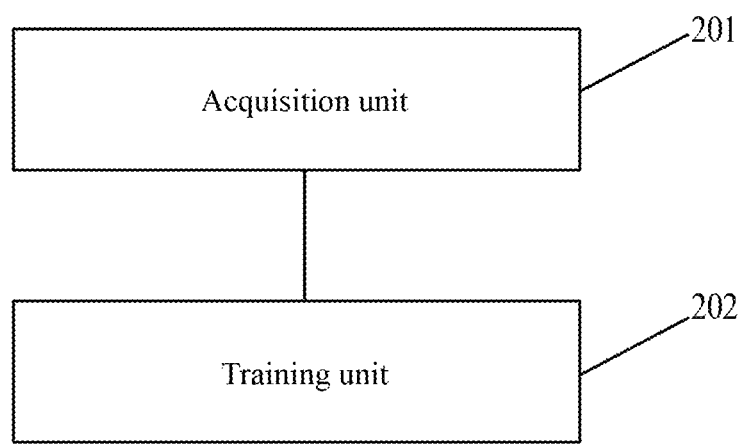
FIG. 2 is a schematic structural diagram of an embodiment of an apparatus for generating a speech synthesis model according to the present disclosure.

Referring to FIG. 2, as an implementation of the method shown in the above figure, the present disclosure provides an embodiment of an apparatus for generating a speech synthesis model. The embodiment of the apparatus corresponds to the embodiment of the method as illustrated in FIG. 1.

As shown in FIG. 2, the apparatus for generating a speech synthesis model includes: an acquisition unit 201, and a training unit 202. The acquisition unit 201 is configured to acquire a plurality of types of training samples. Each of the plurality of types of training samples includes a text of the type, and the speech of the text having a style of speech corresponding to the type read by an announcer corresponding to the type in the style. The training unit 202 is configured to train a neural network corresponding to a speech synthesis model using the plurality of types of training samples and an annotation of the style of speech in the each of the plurality of types of training samples to obtain the speech synthesis model. The speech synthesis model is used to synthesize the speech of the announcer corresponding to each of the plurality of types having a plurality of styles.

In some alternative implementations of this embodiment, the training unit includes an annotation input subunit. The annotation input subunit is configured to combine the annotation of the style of speech in the each of the plurality of types of training samples and an output of the neural network in a selected layer in the neural network corresponding to the speech synthesis model to form an input of the neural network in an upper layer of the selected layer in the neural network corresponding to the speech synthesis model.

In some alternative implementations of this embodiment, the annotation input subunit is further configured to: combine a style vector corresponding to the speech in the each of the plurality of types of training samples and an output vector of the neural network in the selected layer of the neural network corresponding to the speech synthesis model to form an input vector of the neural network in the upper layer of the selected layer in the neural network corresponding to the speech synthesis model.

In some alternative implementations of this embodiment, the annotation input subunit is further configured to: combine, when the selected layer in the neural network corresponding to the speech synthesis model is a layer connected to an output layer of the neural network corresponding to the speech synthesis model, the style vector corresponding to the speech in the each of the plurality of types of training samples and the output vector of the layer connected to the output layer of the neural network corresponding to the speech synthesis model to form an input vector, and input the input vector into the output layer of the neural network corresponding to the speech synthesis model.

In some alternative implementations of this embodiment, the apparatus for generating a speech synthesis model further includes: a synthesizing unit. The synthesizing unit is configured to receive an inputted speech synthesis instruction and a second text after the speech synthesis model is obtained, wherein the speech synthesis instruction includes: a first identifier of the announcer selected by a user, and a second identifier of the style of speech selected by the user; and synthesize the speech of the second text of the announcer selected by the user having the style of speech selected by the user using the speech synthesis model.

Figure 3:
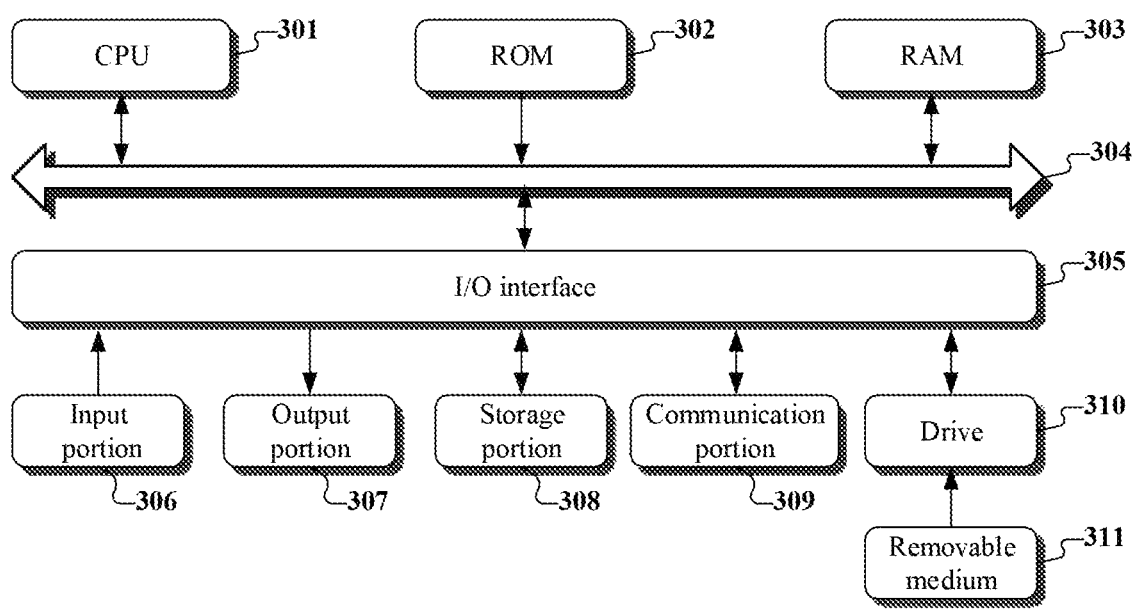
FIG. 3 is a schematic structural diagram of a computer system adapted to implement an electronic device according to embodiments of the present disclosure.

FIG. 3 is a schematic structural diagram of a computer system adapted to implement an electronic device according to embodiments of the present disclosure.

As shown in FIG. 3, the computer system 300 includes the central processing unit (CPU) 301, which may execute various appropriate actions and processes in accordance with a program stored in the read-only memory (ROM) 302 or a program loaded to the random access memory (RAM) 303 from the storage portion 308. The RAM 303 also stores various programs and data required by operations of the computer system. The CPU 301, the ROM 302, and the RAM 303 are connected to each other through the bus 304. The input/output (I/O) interface 305 is also connected to the bus 304.

The following components are connected to the I/O interface 305: the input portion 306; the output portion 307; the storage portion 308 including a hard disk and the like; and the communication portion 309 including a network interface card, such as a LAN card and a modem. The communication portion 309 performs communication processes via a network, such as the Internet. The driver 310 is also connected to the I/O interface 305 as required. The removable medium 311, such as a magnetic disk, an optical disk, a magneto-optical disk, and a semiconductor memory, may be installed on the driver 310, to facilitate the installation of a computer program read from the removable medium 311 on the storage portion 308 as needed.

In particular, the processes described in the embodiments of the present disclosure may be implemented in a computer program. For example, the embodiments of the present disclosure include a computer program product, which comprises a computer program that is hosted in a machine-readable medium. The computer program includes instructions for executing the method as illustrated in the flow chart. The computer program may be downloaded and installed from a network via the communication portion 309, and/or may be installed from the removable media 311. The computer program, when executed by the central processing unit (CPU) 301, performs the above mentioned functionalities as defined in the method of the present disclosure.

The present disclosure further provides an electronic device. The electronic device may include one or more processors; and a memory configured to store one or more programs. The one or more programs may contain instructions used to perform the operations described in steps 101-102. The one or more programs, when executed by the one or more processors, cause the one or more processors to perform the operations described in steps 101-102.

The present disclosure further provides a computer readable storage medium. The computer readable storage medium may be the computer storage medium included in an electronic device, or a stand-alone computer readable storage medium not assembled into the electronic device. The computer readable storage medium hosts one or more programs. The one or more programs, when executed by the electronic device, cause the electronic device to: acquire a plurality of types of training samples, each of the plurality of types of training samples including a text of the type, and a speech of the text having a style of speech corresponding to the type read by an announcer corresponding to the type in the style; and train a neural network corresponding to a speech synthesis model using the plurality of types of training samples and an annotation of the style of speech in the each of the plurality of types of training samples to obtain the speech synthesis model, the speech synthesis model being used to synthesize the speech of the announcer corresponding to each of the plurality of types having a plurality of the styles.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, and a training unit, where the names of these units or modules do not in some cases constitute a limitation to such units or modules themselves. For example, the acquisition unit may also be described as "a unit for acquiring a plurality of types of training samples."

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for generating a speech synthesis model, comprising:
    acquiring a plurality of types of training samples, each sample of one of the plurality of types including a text of said type and a speech of said text, the speech having a style of speech corresponding to said type and being read by an announcer corresponding to said type, wherein the plurality of types, styles of speeches and announcers are in one-to-one correspondence; and
    training a neural network using the plurality of types of training samples and an annotation of the style of speech in the each of the plurality of types of training samples to obtain the speech synthesis model, the speech synthesis model being used to synthesize speeches having a plurality of styles of speeches of an announcer corresponding to each of the plurality of types,
    wherein the training the neural network using the plurality of types of training samples and an annotation of the style of speech in the each of the plurality of types of training samples to obtain the speech synthesis model comprises:
        combining a style vector corresponding to the style of the speech in the each of the plurality of types of training samples and an output vector of the selected layer in the neural network to form an input vector of the upper layer of the selected layer in the neural network, wherein the style vector corresponding to the style of speech in the each of the plurality of types of training samples includes respective components corresponding to styles of speech in the training samples, with a numerical value of a component corresponding to the style of speech in the training sample being 1 and numerical values of components of other styles of speech being 0.

2. The method according to claim 1, wherein the selected layer in the neural network is a layer connected to an output layer of the neural network; and
    the combining the annotation of the style of speech in the each of the plurality of types of training samples and an output of a selected layer in the neural network to form an input of an upper layer of the selected layer in the neural network comprises:
        combining a style vector corresponding to the speech in the each of the plurality of types of training samples and an output vector of the layer connected to the output layer of the neural network to form an input vector, and inputting the input vector into the output layer of the neural network.

3. The method according to claim 1, wherein after obtaining the speech synthesis model, the method further comprises:
    receiving an inputted speech synthesis instruction and a second text, wherein the speech synthesis instruction includes: a first identifier of the announcer selected by a user, and a second identifier of the style of speech selected by the user; and
    synthesizing the speech of the second text of the announcer selected by the user having the style of speech selected by the user using the speech synthesis model.

4. The method according to claim 1, wherein the training the neural network using the plurality of types of training samples and the annotation of the style of speech in the each of the plurality of types of training samples to obtain the speech synthesis model comprises:
    training the neural network using the plurality of types of training samples and the annotation of the style of speech in the each of the plurality of types of training samples, wherein the neural network simultaneously learns an acoustic characteristic of each announcer and a characteristic of a style of speech corresponding to the each announcer, to obtain the speech synthesis model, the speech synthesis model being used to synthesize speeches having a plurality of styles of speech of an announcer corresponding to each of the plurality of types by combining the acoustic characteristic of the announcer corresponding to each of the plurality of types and the characteristic of the style of speech corresponding to the each announcer.

5. An apparatus for generating a speech synthesis model, comprising:
    at least one processor; and
    a memory storing instructions, the instructions when executed by the at least one processor, cause the at least one processor to perform operations, the operations comprising:
        acquiring a plurality of types of training samples, each sample of one of the plurality of types including a text of said type and a speech of said text, the speech having a style of speech corresponding to said type and being read by an announcer corresponding to said type, wherein the plurality of types, styles of speeches, and announcers are in one-to-one correspondence; and training a neural network using the plurality of types of training samples and an annotation of the style of speech in the each of the plurality of types of training samples to obtain the speech synthesis model, the speech synthesis model being used to synthesize speeches having a plurality of styles of speeches of an announcer corresponding to each of the plurality of types, wherein the training the neural network using the plurality of types of training samples and an annotation of the style of speech in the each of the plurality of types of training samples to obtain the speech synthesis model comprises:

combining a style vector corresponding to the style of the speech in the each of the plurality of types of training samples and an output vector of the selected layer in the neural network to form an input vector of the upper layer of the selected layer in the neural network, wherein the style vector corresponding to the style of speech in the each of the plurality of types of training samples includes respective components corresponding to styles of speech in the training samples, with a numerical value of a component corresponding to the style of speech in the training sample being 1 and numerical values of components of other styles of speech being 0.

6. The apparatus according to claim 5, wherein the selected layer in the neural network is a layer connected to an output layer of the neural network; and the combining the annotation of the style of speech in the each of the plurality of types of training samples and an output of a selected layer in the neural network to form an input of an upper layer of the selected layer in the neural network comprises:

combining a style vector corresponding to the speech in the each of the plurality of types of training samples and an output vector of the layer connected to the output layer of the neural network to form an input vector, and inputting the input vector into the output layer of the neural network.

7. The apparatus according to claim 5, wherein after obtaining the speech synthesis model, the operations further comprise:

receiving an inputted speech synthesis instruction and a second text, wherein the speech synthesis instruction includes: a first identifier of the announcer selected by a user, and a second identifier of the style of speech selected by the user; and synthesizing the speech of the second text of the announcer selected by the user having the style of speech selected by the user using the speech synthesis model.

8. A non-transitory computer-readable storage medium storing a computer program, the computer program when executed by one or more processors, causes the one or more processors to perform operations, the operations comprising:

acquiring a plurality of types of training samples, each sample of one of the plurality of types including a text of said type and a speech of said text, the speech having a style of speech corresponding to said type and being read by an announcer corresponding to said type, wherein the plurality of types, styles of speeches, and announcers are in one-to-one correspondence; and training a neural network using the plurality of types of training samples and an annotation of the style of speech in the each of the plurality of types of training samples to obtain the speech synthesis model, the speech synthesis model being used to synthesize speeches having a plurality of styles of speeches of an announcer corresponding to each of the plurality of types, wherein the training the neural network using the plurality of types of training samples and an annotation of the style of speech in the each of the plurality of types of training samples to obtain the speech synthesis model comprises:

combining a style vector corresponding to the style of the speech in the each of the plurality of types of training samples and an output vector of the selected layer in the neural network to form an input vector of the upper layer of the selected layer in the neural network, wherein the style vector corresponding to the style of speech in the each of the plurality of types of training samples includes respective components corresponding to styles of speech in the training samples, with a numerical value of a component corresponding to the style of speech in the training sample being 1 and numerical values of components of other styles of speech being 0.

9. The method according to claim 1, wherein the style of speech comprises at least one of: a style of reading news or a style of reading novel.

* * * * *